Aug. 30, 1932.  R. E. MARBURY  1,874,109

HIGH VOLTAGE DIRECT CURRENT SYSTEM

Filed July 24, 1925

WITNESSES:
Fred C. Wilhams
H. Keith

INVENTOR
Ralph E. Marbury
BY
Wesley G. Carr
ATTORNEY

Patented Aug. 30, 1932

1,874,109

UNITED STATES PATENT OFFICE

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA

HIGH VOLTAGE DIRECT CURRENT SYSTEM

Application filed July 24, 1925. Serial No. 45,847.

My invention relates to means for producing current at high voltages and it has particular relation to the production of unidirectional current of high voltage.

An object of my invention is to produce current that will be suitable for use with precipitating apparatus, cable testing, and the like, requiring unusually high unidirectional voltages.

Apparatus of somewhat similar character has been employed which, in some instances, is open to objections involving insulating problems in particular.

It has been found very difficult to manufacture thermionic rectifiers for use in systems employing very high voltages. It is also difficult to suitably insulate transformers in connection with such systems.

In accordance with my invention, it becomes practical to produce a system employing rectified current of, for example, 100,000 to 1,000,000 volts, as conditions may demand.

I propose to employ a plurality of transformers connected in cascade relation, whereby the maximum voltage of each transformer shall not exceed, for example 50,000 volts. The current induced in the several transformers is rectified and applied to a plurality of series-connected condensers. The maximum unidirectional voltage is equal to the sum of the voltages of the several condensers.

Any suitable form of rectifier may be employed but I prefer to utilize rectifiers of the thermionic type and, furthermore, I avoid the use of batteries for energizing or heating the rectifier filaments.

Figure 1:
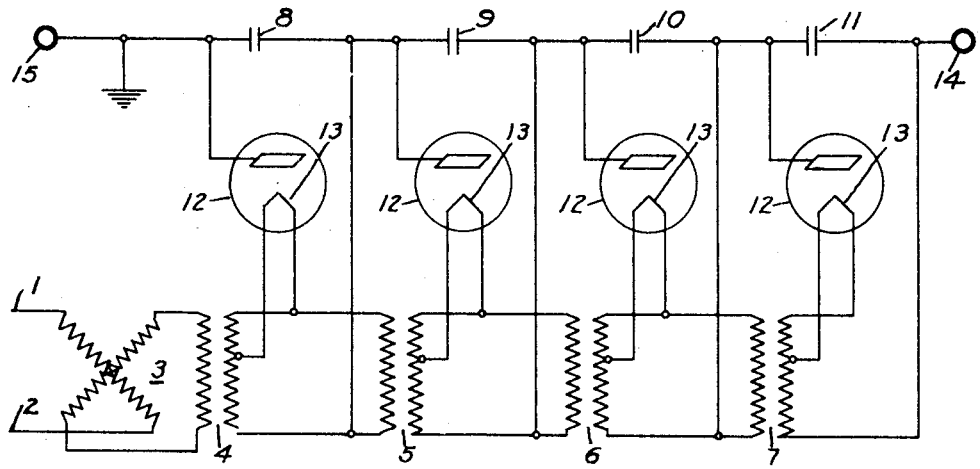
Figure 2:
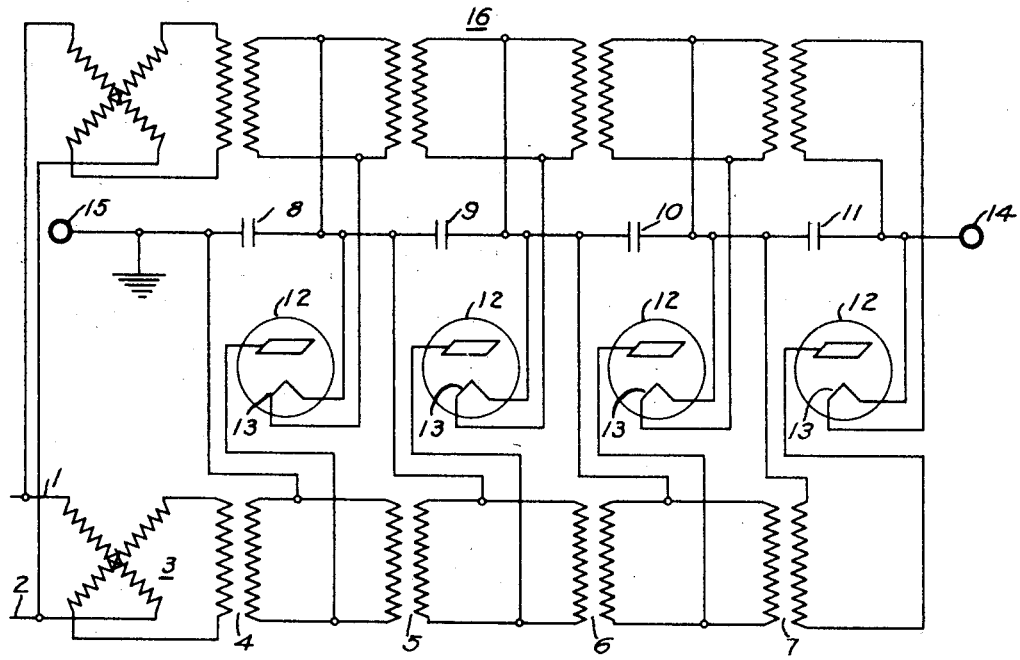

My invention will be best understood by reference to the accompanying drawing, in which Figure 1 is a diagrammatic representation of circuits and apparatus embodying my invention, and Fig. 2 is a modification of the system illustrated in Fig. 1.

A source of alternating-current energy is employed comprising line conductors 1 and 2 and also some form of voltage regulator, such as the illustrated induction regulator 3. The voltage of the source may be assumed, for example, as 110 volts, and is utilized for the purpose of supplying the several transformers 4 to 7 inclusive, which are connected in cascade relation. The first transformer 4 may be assumed to "step up" the voltage from 110 volts to 50,000 volts, and the remaining transformers 5, 6, and 7 in the system of Fig. 1 are of the 1:1 winding ratio, that is to say, 50,000 volts to 50,000 volts.

The illustrated condensers 8, 9, 10 and 11 are connected in series relation for producing a terminal voltage of 200,000 volts when connected in accordance with Fig. 1. A thermionic rectifier 12 is connected in circuit with the secondary winding of each transformer and the filament 13 of each rectifier is connected across a portion of the corresponding secondary transformer winding. In this manner, the necessary low voltage is supplied to the rectifier filaments.

One terminal of each secondary transformer winding is connected to one side of the corresponding condenser, while the plate terminal of each rectifier is connected to the opposite side of the respective condensers.

It will be evident, therefore, with reference to Fig. 1, that a voltage corresponding to the secondary voltage of each transformer is respectively applied through the rectifiers 12 to charge the several condensers. It will also be evident that, since current can pass through the rectifiers 12 in only one direction, a unidirectional current must flow through the series-connected condensers and is available at the contact terminals 14 and 15, at a voltage equal to four times the voltage of one condenser which amounts to 200,000 volts in the example illustrated. Any number of units comprising similarly connected transformers, condensers and rectifiers may be employed to produce a terminal voltage of any desired value without increasing the voltage strain on the several related pieces of apparatus.

The system of Fig. 1 is open to the objection that, in order to vary the terminal voltage, the voltage applied to the filaments will also vary unless they are reconnected to different transformer taps. It may be desirable, when it is necessary to employ variable voltage, to utilize the system of Fig. 2, in which a separate or auxiliary bank of cascade-connected transformers 16 is provided for supplying energy from the supply conductors 1 and 2 to the respective rectifier filaments 13. The terminals of each secondary winding of the main transformers 4 to 7, inclusive, are respectively connected to the plate terminals of the corresponding rectifiers 12 and to one terminal of the corresponding condensers 8 to 11, inclusive. In accordance with this arrangement, the voltage of the main circuit may be varied without disturbing the filament voltage. The main scheme of connections is similar to that employed in Fig. 1, and the terminal voltage in either case corresponds to the number of units comprising the series-connected condensers.

I am aware of the fact that transformer devices, in combination with suitable condensers and rectifiers, have been employed for the purpose of producing a unidirectional voltage of a value higher than the voltage of the alternating-current source. However, such systems, insofar as I am aware, are limited as to the maximum voltage obtainable, whereas, in accordance with my system, any desired voltage may be derived by increasing the number of units employed in the manner described.

It is believed that the advantages of my invention will be apparent to those skilled in the art and that various modifications may be made therein, within the scope of my invention.

I claim as my invention:

1. A system for transforming alternating current of low voltage to direct current of higher voltage comprising a low-voltage source of alternating current, a plurality of transformers connected in cascade with respect to said source for increasing the voltage of the system to any desired level, a plurality of rectifiers each associated with a corresponding transformer for changing the higher-voltage alternating current to direct current, and means for integrating the voltage effects derived from said rectifiers.

2. A system for transforming single phase alternating current of low voltage into direct current of high voltage, comprising a plurality of transformers connected in cascade, a plurality of vacuum tube rectifiers corresponding to the various transformers, each rectifier being energized by alternating current derived from the corresponding transformer and being employed to convert a large portion of the alternating current transmitted by that transformer into direct current, and means to additively combine the voltage effects of the various rectifiers.

In testimony whereof, I have hereunto subscribed my name this 9th day of July 1925.

RALPH E. MARBURY.